United States Patent [19]
Nakano

[11] Patent Number: 5,706,125
[45] Date of Patent: Jan. 6, 1998

[54] OPTICAL SIGNAL AMPLIFYING CIRCUIT

[75] Inventor: Hiroyuki Nakano, Yokohama, Japan

[73] Assignee: Hitachi, Ltd., Tokyo, Japan

[21] Appl. No.: 666,845

[22] Filed: Jun. 19, 1996

[30] Foreign Application Priority Data

Jun. 28, 1995 [JP] Japan ................. 7-162403

[51] Int. Cl.[6] ............................................ H01S 3/00
[52] U.S. Cl. ...................... 359/341; 359/124; 359/161
[58] Field of Search ............................. 359/341, 337, 359/161, 124

[56] References Cited

U.S. PATENT DOCUMENTS

| | | |
|---|---|---|
| 5,436,760 | 7/1995 | Nakabayashi ............ 359/341 |
| 5,526,175 | 6/1996 | Minelly et al. ............ 359/341 |

OTHER PUBLICATIONS

IEEE Photonics Technology Letters, vol. 3, No. 8, 1991, pp. 718–720.

*Primary Examiner*—Mark Hellner
*Attorney, Agent, or Firm*—Bardehle, Pagenberg, Dost, Altenburg, Frohwitter, Geissler & Partners

[57] ABSTRACT

A wide-band optical signal amplifying circuit having gain exhibiting less wavelength dependency for amplifying optical signal and analogue-modulated optical signal. The optical signal amplifying circuit includes one or a plurality of optical amplifiers for amplifying en bloc optical signal components of respective wave-lengths of a wavelength-multiplexed optical signal and a multi-cavity type or the like dielectric multilayer interference filter disposed at an input or output side of the optical amplifier or therebetween. The dielectric multilayer interference filter is stable over a wide band and exhibits a steep cut-off characteristic. The multi-cavity type dielectric multilayer interference filter has a center wavelength for transmission which is variable.

2 Claims, 7 Drawing Sheets

OPTICAL SIGNAL AMPLIFYING CIRCUIT

BACKGROUND OF THE INVENTION

The present invention relates generally to an optical signal amplifying circuit. More particularly, the invention is concerned with an optical signal amplifying circuit which exhibits a wide-band amplification characteristic and which can be used advantageously and profitably as an optical transmission device in optical communication systems such as an optical transmitter, optical receiver, optical repeater, branching loss compensating optical amplifier or the like.

The optical amplifier for amplifying simultaneously or en bloc optical signal components contained in a wavelength-multiplexed optical signal resulting from multiplexing of a plurality of optical signals having different wavelengths is generally implemented in such a configuration in which a Mach-Zehnder filter is disposed at an output stage in an attempt to compensate for wavelength dependency of the gain. As the conventional techniques known heretofore concerning this sort of optical signal amplifying circuit, there may be mentioned one disclosed in "IEEE Photonics Technology Letters", Vol. 3, No. 8, 1991, pp. 718–720.

For having better understanding of the present invention, technical background thereof will first be reviewed briefly. FIG. 1 of the accompanying drawings is a block diagram showing, by way of example, a basic circuit structure or configuration of a conventional optical signal amplifying circuit designed for amplifying a wavelength-multiplexed optical signal, which will be described below. In the figure, reference numeral 11 denotes generally an optical signal amplifying circuit, 1 designates an optical amplifier and 22 designates a Mach-Zehnder filter.

Referring to FIG. 1, the optical amplifier 1 destined for amplifying en bloc or collectively optical signal components having respective wavelengths is implemented by using an Er (erbium)-doped optical fiber amplifier for amplifying a wavelength-multiplexed optical signal obtained by multiplexing optical signals of different wavelengths $\lambda 1$ to $\lambda n$. The Mach-Zehnder filter 22 connected to the output of the optical amplifier 1 serves as an optical equalizer circuit. The Mach-Zehnder filter 22 exhibits a characteristic of a gradient opposite to that of gain of the optical amplifier 1 within a relatively narrow wavelength band ranging from about 1548 to 1555 nm (nanometers) and is used for the purpose of compensating for the wavelength dependency of the gain of the optical signal amplifying circuit 11.

The conventional optical signal amplifying circuit 11 described above however suffers a problem that difficulty is encountered in implementing the optical signal amplifying circuit with high reliability because of instability of the Mach-Zehnder filter 22 employed as the optical equalizer circuit with regard to the polarization dependency and temperature characteristic.

Besides, the conventional optical signal amplifying circuit known heretofore suffers another problem in that wide-band characteristic on the order of 30 nm in the bandwidth which can ensure utilization of the wide-band characteristic of the Er-doped optical fiber amplifier to a maximum cannot be realized, because the gain compensating range is limited to a range of several nanometers around the wavelength of 1550 nm for the reason that the compensation for the wavelength dependency of the gain is limited to only a narrow wavelength range due to the intrinsic characteristic of the Mach-Zehnder filter 22.

Additionally, the conventional technique described above suffers a problem that extra-band spontaneous emission light, excitation light, monitoring light, etc., can not adequately be eliminated because of rather gentle cut-off characteristic of the Mach-Zehnder filter 22.

SUMMARY OF THE INVENTION

In the light of the state of the art described above, it is an object of the present invention to provide an optical signal amplifying circuit which is essentially immune to the problems of the prior art mentioned above and which can ensure an improved controllability and a wide-band characteristic by using an optical filter of high stability and high reliability.

In view of the above and other objects which will become apparent as the description proceeds, there is provided according to a general aspect of the present invention a wide-band optical signal amplifying circuit which includes one or plurality of optical amplifiers for amplifying en bloc optical signal components of respective wavelengths contained in a wavelength-multiplexed optical signal and a multi-cavity type dielectric multilayer interference filter disposed at an input or output side of the optical amplifier or therebetween. The dielectric multilayer interference filter is stable over a large bandwidth and exhibits a steep cut-off characteristic while having a center wavelength for transmission which is variable.

In implementing the optical signal amplifying circuit according to the invention, it is preferred to use a multi-cavity type band-pass dielectric multilayer interference filter of a multi-cavity type which has a half-amplitude level capable of accommodating demanded band width (ranging from several nanometers to several ten nanometers) for constituting an optical equalizer. With this arrangement, it is possible to realize the optical signal amplifying circuit which can enjoy a broad band characteristic.

In general, the Er-doped optical fiber amplifier constructed without using the optical equalizer circuit has a peak gain at or in the vicinity of the wavelength of 1532 nm and exhibits excessive or steep amplification characteristic when compared with the gain within a band ranging from 1540 nm to 1560 nm. In order to obtain flat gain characteristic for the wavelengths, it is required to suppress the gain peak making appearance in a shorter wavelength range. The multi-cavity type dielectric multilayer interference filter is excellent not only in respect to the intra-band flatness but also with regard to the extra-band suppression characteristic because of a steep cut-off characteristic. Besides, the multi-cavity type dielectric multilayer interference filter has a center wavelength for transmission which can easily be varied.

In the optical signal amplifying circuit according to the present invention, the multi-cavity type dielectric multilayer interference filter mentioned above is applied to the Er-doped optical fiber amplifier. Thus, the gain peak which will otherwise make appearance in a short-wavelength range can be suppressed satisfactorily while ensuring a flat gain characteristic over a long-wavelength range, whereby optical amplification characteristic over a broad band can be realized. Further, the wavelength dependency of the gain is very susceptible to the influence of the input signal power and the excitation power. In this conjunction, it should be mentioned that by varying the transmission center wavelength of the multi-cavity type dielectric multilayer interference filter, the broad band characteristic can be realized over a wide dynamic range. Besides, in the optical signal amplifying circuit according to the invention, unwanted or spurious leakage such as extra-band spontaneous emission light, excitation light, monitoring light and the like can be suppressed sufficiently.

Parenthetically, the multi-cavity type dielectric multilayer interference filter having a half-amplitude level ranging from several nanometers to several ten nanometers is practically used in various optical communication system and known as having high stability and reliability.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
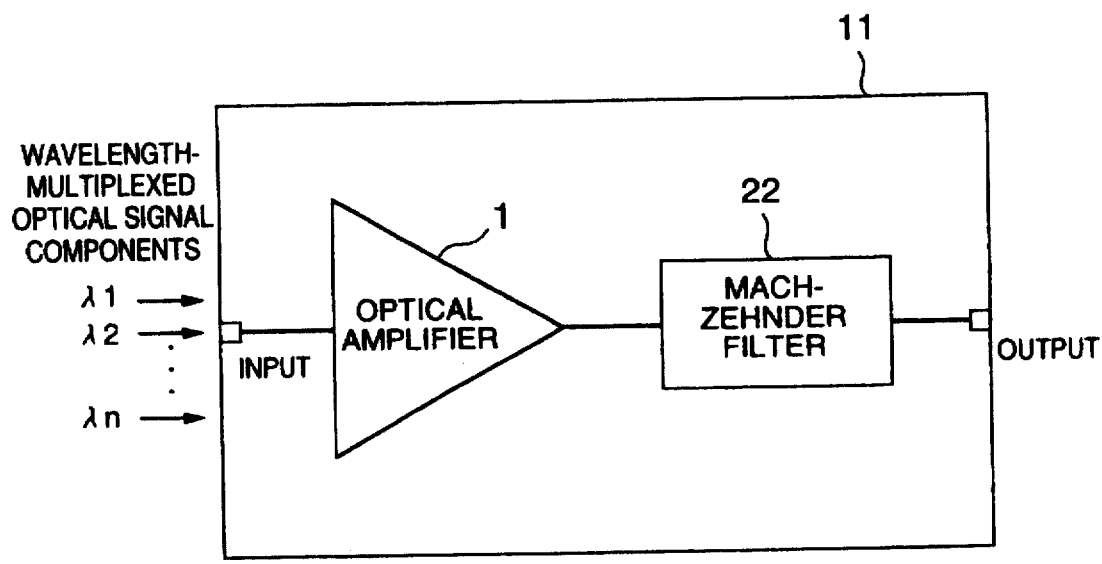
FIG. 1 is a block diagram showing, by way of example, a basic circuit structure of a conventional optical signal amplifying circuit known heretofore.

Now, the present invention will be described in detail in conjunction with the optical signal amplifying circuit having wide-band amplification characteristic. In the following description, like reference characters designate like or corresponding parts throughout the several views.

Figure 2:
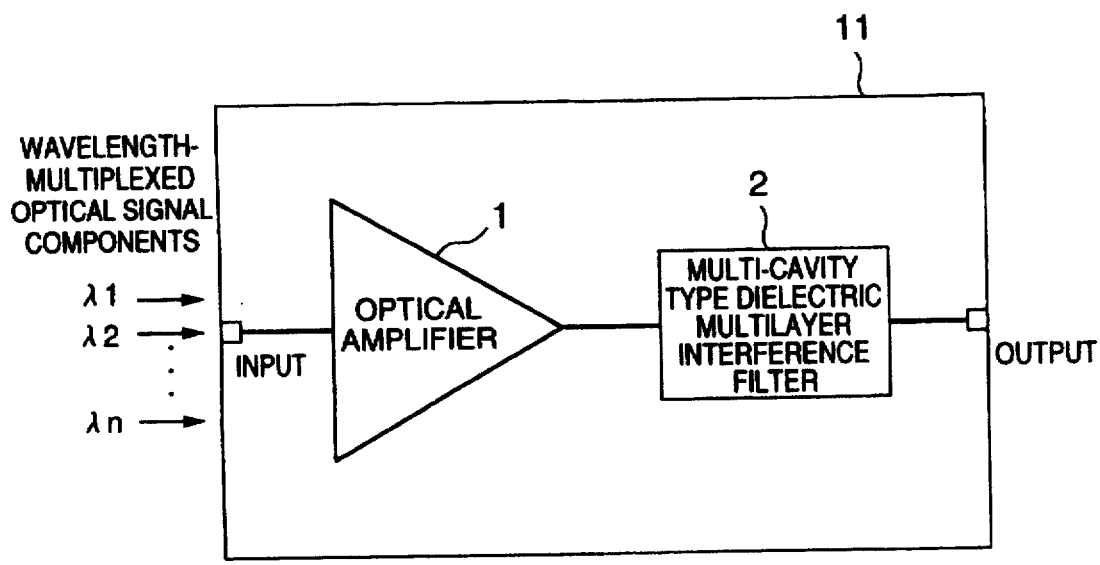
FIG. 2 is a block diagram showing a circuit configuration of an optical signal amplifying circuit according to a first embodiment of the present invention.
Figure 3:
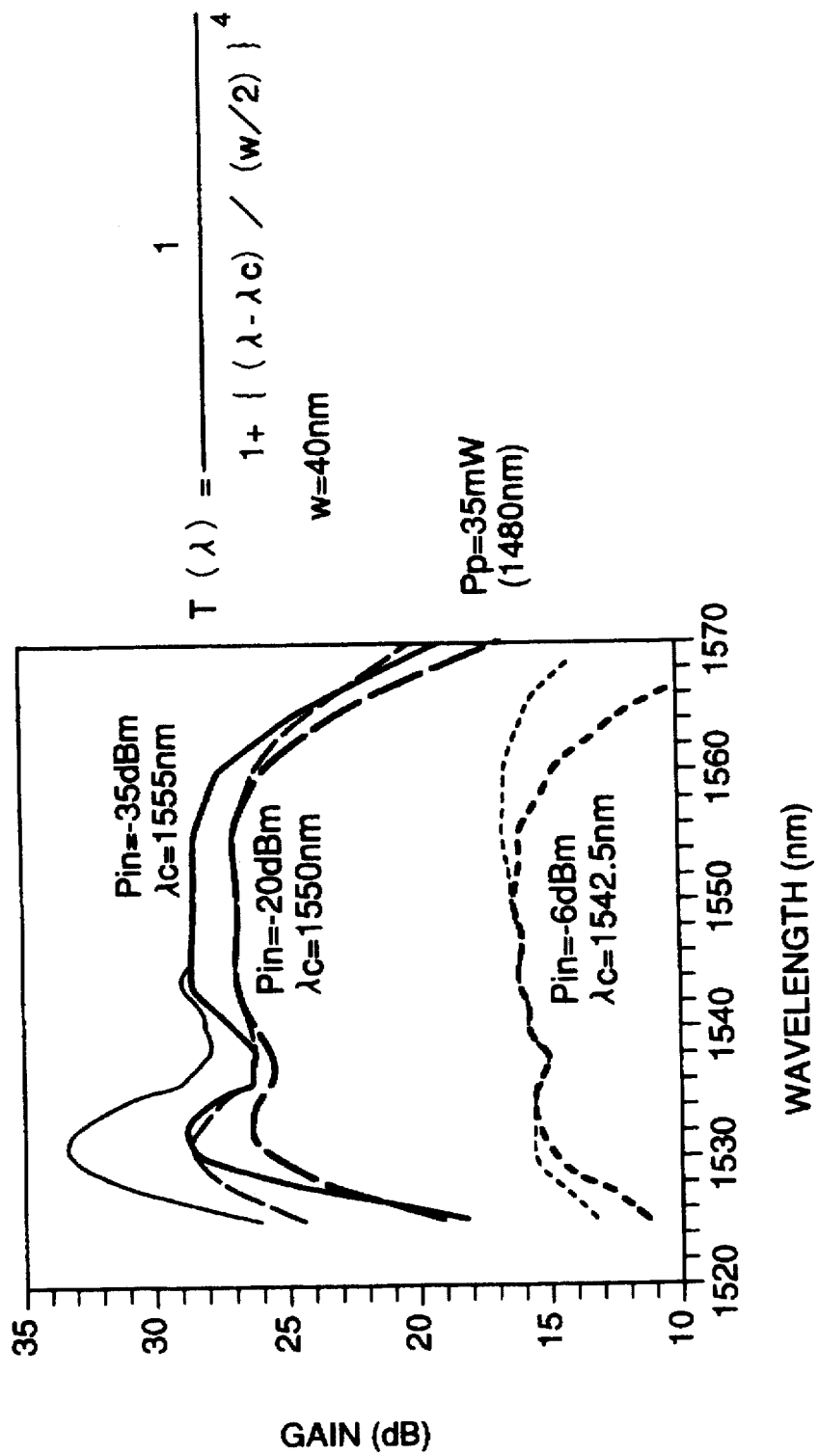
FIG. 3 is a gain-versus-wavelength characteristic diagram for illustrating operations of the optical signal amplifying circuit according to the first embodiment of the invention.

FIG. 2 is a block diagram showing a circuit configuration of an optical signal amplifying circuit according to a first embodiment of the present invention, and FIG. 3 is a gain-versus-wavelength characteristic diagram for illustrating operation or effect of the optical signal amplifying circuit according to the first embodiment of the invention. In FIG. 2, components same as or equivalent to those shown in FIG. 1 are denoted by like reference characters. Further, in FIG. 2, reference numeral 2 denotes a multi-cavity type dielectric multilayer interference filter.

As can be seen in FIG. 2, the optical signal amplifying circuit 11 according to the first embodiment of the present invention is comprised of the optical amplifier 1 designed for amplifying a multiplicity of optical signal components having wavelengths $\lambda 1$ to $\lambda n$ concurrently or en bloc and the multi-cavity type dielectric multilayer interference filter 2 provided at the output side of the optical amplifier 1. The optical amplifier 1 may be constituted, by way of example, by an Er-doped optical fiber amplifier. Thus, it can be appreciated that the optical signal amplifying circuit 11 according to the first embodiment of the invention in FIG. 2 differs from the one shown in FIG. 1 in that the Mach-Zehnder filter 22 is replaced by the multi-cavity type dielectric multilayer interference filter 2.

The gain-versus-wavelength characteristics of the optical signal amplifying circuit according to the first embodiment of the invention are illustrated in FIG. 3, which have experimentally be observed when the exciting wavelength for the optical fiber constituting the optical amplifier 1 is set at 1480 nm with an exciting power being set at 35 mW. More specifically, thin solid line curves represent the gain characteristics (actually measured) in the optical signal amplifying circuit in which the multi-cavity type dielectric multilayer interference filter 2 serving for the purpose of equalization of gain is not provided, while thick solid line curves represent the gain characteristics of the optical signal amplifying circuit 11 which includes the multi-cavity type dielectric multilayer interference filter 2, as shown in FIG. 2, with the optical signal input power Pin at −35 dBm, −20 dBm and −6 dBm, respectively.

It should further be mentioned that the multi-cavity type dielectric multilayer interference filter 2 incorporated in the optical signal amplifying circuit subjected to the experimental measurement mentioned above is constituted by a double-cavity type filter which exhibits transmission characteristic $T(\lambda)$ which can be given by the following expression:

$$T(\lambda)=1/(1+((\lambda-\lambda c)/(w/2))^4) \qquad \text{Exp. 1}$$

In the above expression (1), $\lambda$ represents wavelength, $\lambda c$ represents a transmission center wavelength of the multi-cavity type dielectric multilayer interference filter 2, and w represents a full width half maximum of the same. Furthermore, in conjunction with FIG. 3, it should be mentioned that the transmission center wavelength $\lambda c$ is changed by varying inclination of a filter plate at the half-amplitude level w of 40 nm (fixed). (The transmission-center wavelength $\lambda c$ is variable within a range of several tens nanometers.)

As can be seen from the characteristic diagram shown in FIG. 3, in the optical signal amplifying circuit 11 shown in FIG. 2, a peak of about 5 dB is observed around the wavelength of 1532 nm when the input power Pin is −35 dBm. However, by setting the transmission center wavelength $\lambda c$ of the multi-cavity type dielectric multilayer interference filter 2 at 12555 nm, the peak mentioned above can be suppressed by ca. 0.5 dB. Further, observation at the input power Pin of −20 dB shows that when the multi-cavity type dielectric multilayer interference filter 2 is not employed, the peak of ca. 2 dB can be observed at or in the vicinity of the wavelength of 1532 nm. However, by setting the transmission center wavelength $\lambda c$ of the multi-cavity type dielectric multilayer interference filter 2 at 1550 nm, there can be obtained the gain characteristic exhibiting essentially no peak. Furthermore, at the power input Pin of −6 dBm, no peak can be observed at or in the vicinity of the wavelength of 1532 nm even when the multi-cavity type dielectric multilayer interference filter 2 is not provided. However, excessive gains are observed in a range where the wavelength is longer than 1560 nm, while in the band width of 1530 nm to 1560 nm as required, the extra-band spontaneous emission light is generated excessively. However, when the transmission center wavelength λc of the multi-cavity type dielectric multilayer interference filter 2 is set at 1542.5 nm, the gain characteristic in which the extra-band gain is suppressed can be realized.

The aforementioned advantageous effects of the optical signal amplifying circuit shown in FIG. 2 are ascribable to the use of the double-cavity type dielectric multilayer interference filter as the multi-cavity type dielectric multilayer interference filter 2. In this conjunction, it should however be mentioned that substantially similar advantageous effects can be realized by the optical signal amplifying circuit in which a series connection of single-cavity filters each having transmission characteristic given by the following expression (2) are employed in place of the double-cavity type dielectric multilayer filter.

$$T(\lambda)=1/(1+((\lambda-\lambda c)/(w/2))^2)$$   Exp. 2

Figure 4:
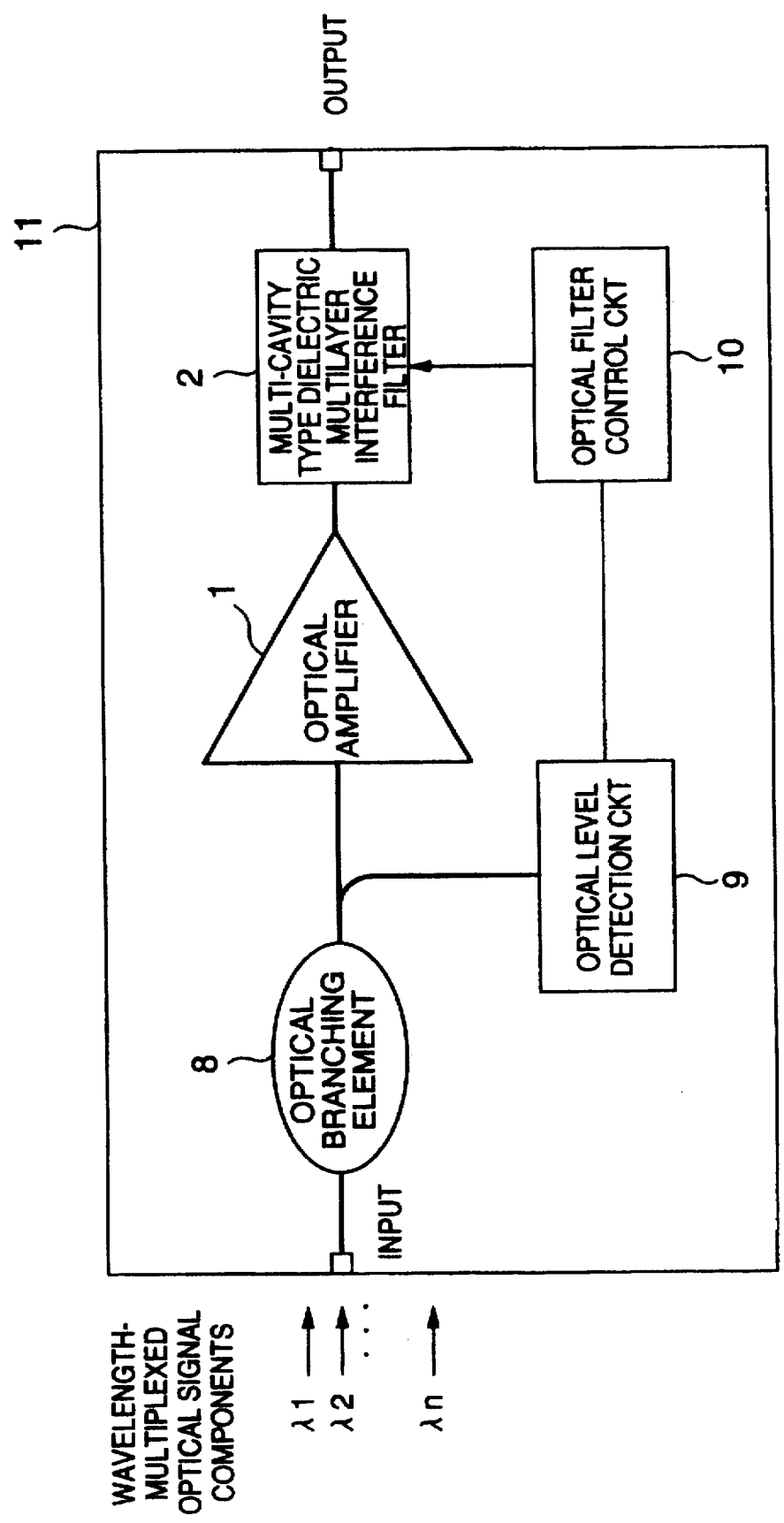
FIG. 4 is a block diagram showing a circuit arrangement of an optical signal amplifying circuit according to a second embodiment of the present invention.

FIG. 4 is a block diagram showing a circuit arrangement of an optical signal amplifying circuit according to a second embodiment of the present invention. In FIG. 4, reference numeral 8 denotes an optical branching element. The other reference characters denote like components as those shown in FIG. 2.

As can be seen from FIG. 4, in the case of the optical signal amplifying circuit 11 according to the second embodiment of the invention, the optical branching element 8 is disposed at the input side of the optical amplifier 1 of the optical signal amplifying circuit 11 according to the first embodiment of the invention shown in FIG. 2, wherein one part of the input optical signal as branched by the optical branching element 8 is inputted to the optical amplifier 1 while the other part is inputted to an optical level detection circuit 9 designed for detecting the level of the input light. The detection signal outputted from the optical level detection circuit 9 is supplied to an optical filter control circuit 10 which is so arranged as to control the multi-cavity type dielectric multilayer interference filter 2 so that the transmission center thereof becomes optimal in conformance with the input level.

In this way, according to the teachings of the invention incarnated in the second embodiment thereof, there can be realized an optical signal amplifying circuit of a broad bandwidth which can exhibit less wavelength dependency of the gain.

Figure 5:
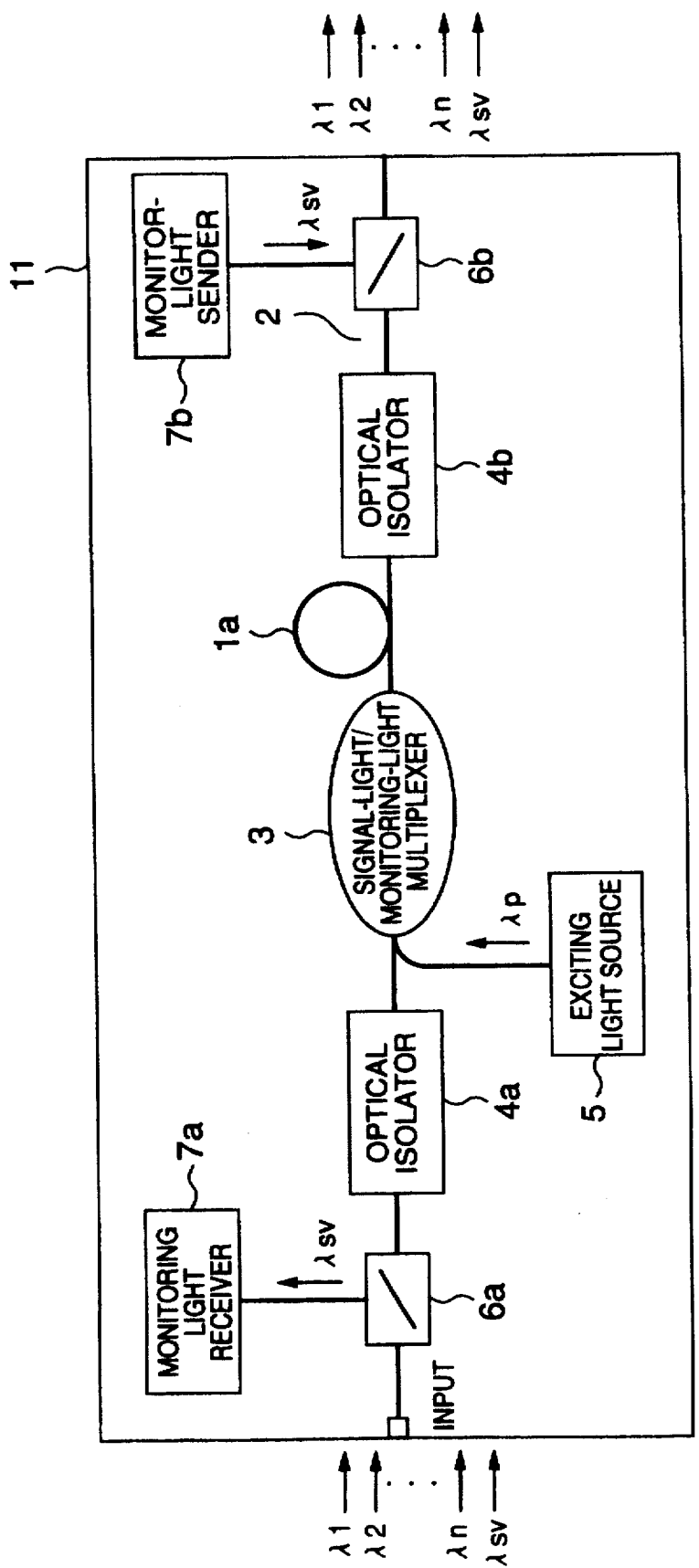
FIG. 5 is a block diagram showing a concrete circuit configuration of an optical signal amplifying circuit according to a third embodiment of the present invention.
Figure 6:
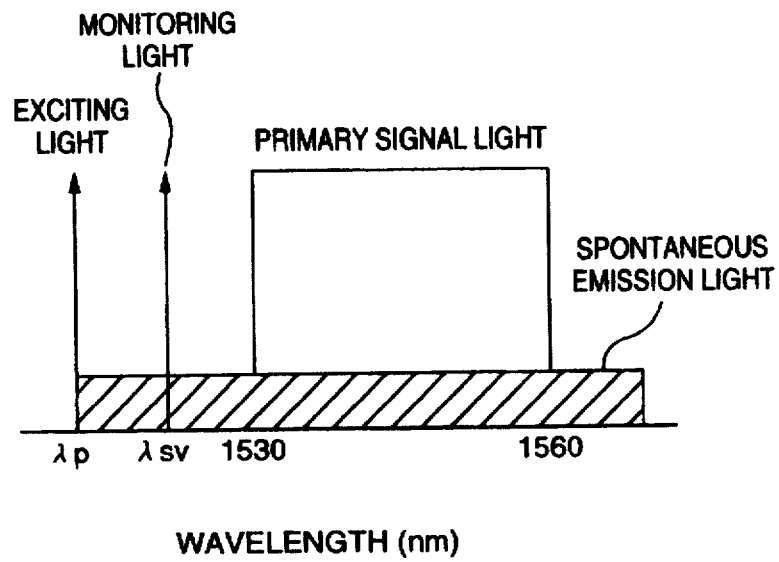
FIG. 6 is a view for illustrating wavelength distributions in an optical amplification band and extra-band in the optical signal amplifying circuit according to the third embodiment of the invention.

FIG. 5 is a block diagram showing a concrete circuit configuration of the optical signal amplifying circuit according to a third embodiment of the invention and FIG. 6 is a view for illustrating wavelength distributions in an optical amplification band and an extra-band. In FIG. 5, reference character 1a denotes an Er-doped optical fiber, 3 denotes a signal-light/excitation-light multiplexer, coupler, 4a and 4b denote optical isolators, 5 denotes an exciting light source, 6a denotes a signal-light/monitoring-light demultiplexer, 6b denotes a signal-light/monitoring-light multiplexer, 7a denotes a monitoring-light receiver, and 7b denotes a monitoring-light sender. Other reference characters denote components same as or equivalent to those designated by like reference characters in FIG. 2.

The optical signal amplifying circuit 11 according to the third embodiment of the invention shown in FIG. 5 is comprised of an Er-doped optical fiber 1a, a multi-cavity type dielectric multilayer interference filter 2, a signal-light/monitoring-light multiplexer 3, optical isolators 4a and 4b, an exciting light source 5, a signal-light/monitoring-light demultiplexer 6a, a signal-light/monitoring-light multiplexer 6b, a monitoring-light receiver 7a and a monitoring-light sender 7b. The optical signal amplifying circuit 11 according to the instant embodiment of the invention is arranged such that the wavelength of the monitoring-light beam falls outside of the band and the monitoring information originating upstream of the optical signal amplifying circuit 11 is received at an input port by using the signal-light/monitoring-light demultiplexer 6a and the monitoring-light receiver 7a and that the monitoring information mentioned above is sent out from the optical signal amplifying circuit 11 in the direction downstream thereof through cooperation of the signal-light/monitoring-light multiplexer 6b and the monitoring-light sender 7b.

In the case of the optical signal amplifying circuit 11 according to the third embodiment of the invention shown in FIG. 5, the bandwidth of the inherent signal light ranges from 1530 nm to 1560 nm, wherein the wavelength of the monitoring light is set between those of the exciting light and the signal light. When the separation characteristic of the signal-light/monitoring-light demultiplexer 6a is inadequate, a part of the monitoring light will be incident on the Er-doped optical fiber 1a to be thereby amplified and outputted. However, even when unwanted spurious light such as the motoring light, residual excitation light, extra-band spontaneous emission light or the like should make appearance at the output of the optical amplifier due to leakage from the input side, they can be all suppressed satisfactorily by the multi-cavity type dielectric multilayer interference filter 2. Thus, the optical signal amplifying circuit 11 of the configuration shown in FIG. 5 is capable of outputting only the inherent signal light.

Figure 7:
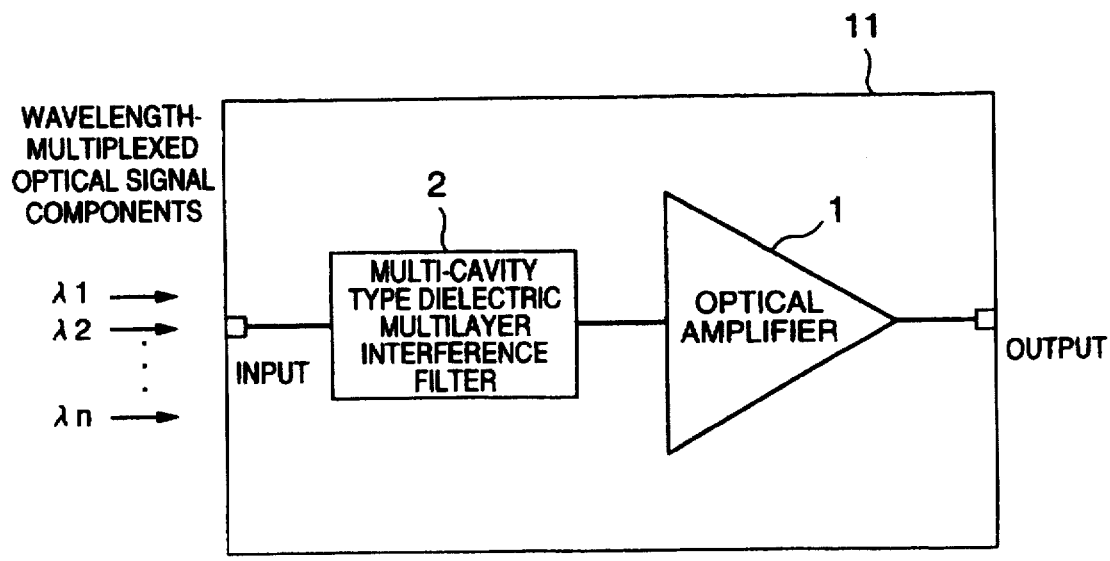
FIG. 7 is a block diagram showing a circuit configuration of an optical signal amplifying circuit according to a fourth embodiment of the present invention.

FIG. 7 is a block diagram showing a circuit configuration of the optical signal amplifying circuit 11 according to a fourth embodiment of the invention. In this figure, reference characters as used designate like parts as those shown in FIG. 2.

The optical signal amplifying circuit 11 according to the fourth embodiment of the invention is composed of the optical amplifier 1 for amplifying concurrently the wavelength-multiplexed optical signal components and a multi-cavity type dielectric multilayer interference filter 2 disposed at the input side of the optical amplifier 1. Thus, the optical signal amplifying circuit 11 according to the instant embodiment of the invention differs from the one shown in FIG. 2 only in that the multi-cavity type dielectric multilayer interference filter 2 is disposed at the input side of the optical amplifier 1. With the optical signal amplifying circuit 11 according to the fourth embodiment, advantageous effects similar to those of the optical signal amplifying circuit 11 according to the first embodiment can be achieved.

Figure 8:
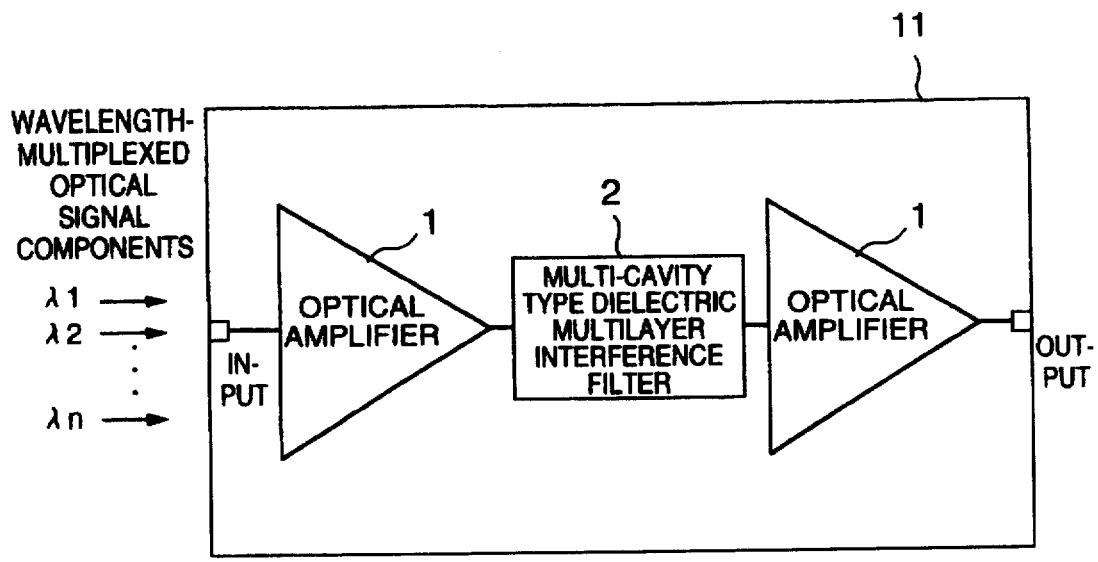
FIG. 8 is a block diagram showing a circuit configuration of an optical signal amplifying circuit according to a fifth embodiment of the present invention.

FIG. 8 is a block diagram showing a circuit configuration of the optical signal amplifying circuit 11 according to a fifth embodiment of the invention. In this figure, reference characters as used designate like parts as those shown in FIG. 2.

The optical signal amplifying circuit 11 according to the fifth embodiment of the invention is composed of two optical amplifiers 1 for amplifying concurrently or en bloc the wavelength-multiplexed optical signal components and the multi-cavity type dielectric multilayer interference filter 2 disposed between these optical amplifiers 1. With such arrangement, similar effects as those of the first embodiment can be obtained.

The fourth and fifth embodiments of the invention described above can ensure similar advantageous effects as these of the first embodiment. When insertion loss of the multi-cavity type dielectric multilayer interference filter 2 is taken into consideration, gain equalization can be realized while maintaining noise index in the case of the first embodiment, while in the case of the fourth embodiment, gain equalization can be realized while sustaining the optical output power. Further, in the case of the fifth embodiment, gain equalization can be achieved with both noise index and optical output power being sustained.

Figure 9:
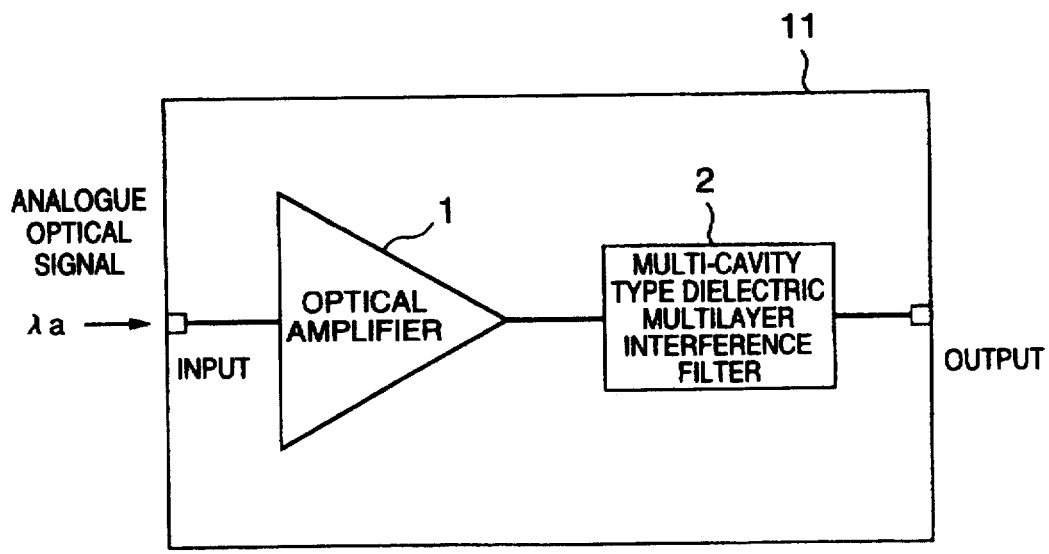
FIG. 9 is a block diagram showing a circuit configuration of an optical signal amplifying circuit according to a sixth embodiment of the present invention.
Figure 10:
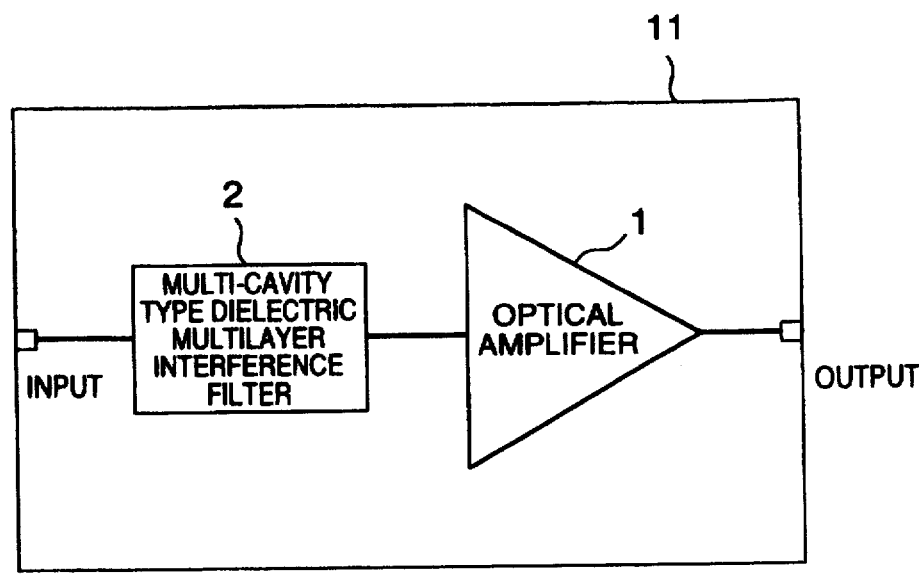
FIG. 10 is a block diagram showing a circuit configuration of an optical signal amplifying circuit according to a seventh embodiment of the present invention.
Figure 11:
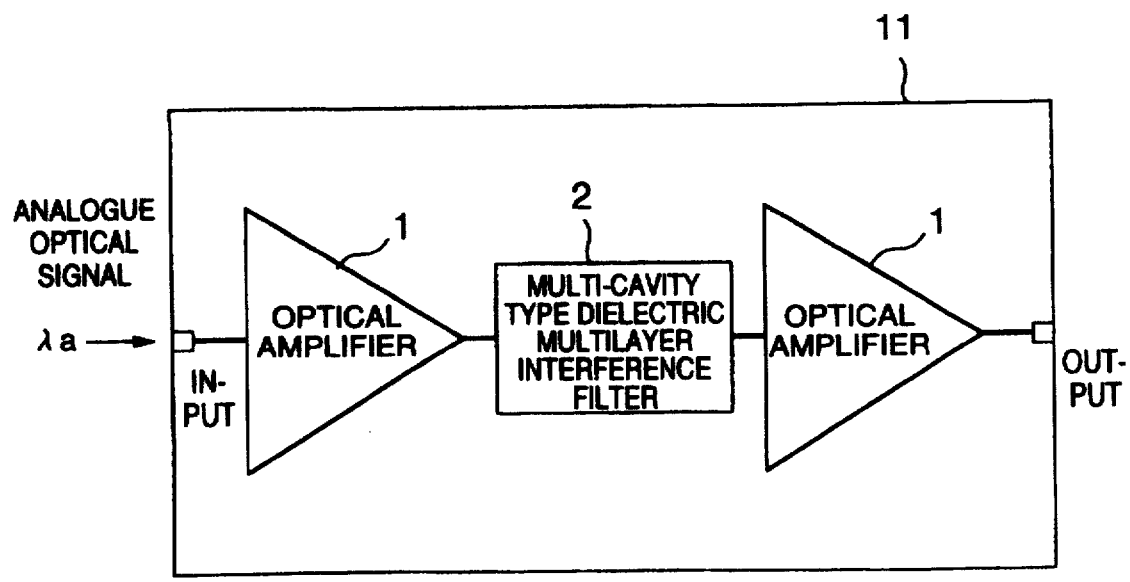
FIG. 11 is a block diagram showing a circuit configuration of an optical signal amplifying circuit according to an eighth embodiment of the present invention.

FIGS. 9, 10 and 11 are block diagrams showing circuit configurations of the optical signal amplifying circuit 11 according to a sixth, seventh and eighth embodiment, respectively, of the invention. In this figure, reference characters as used designate like parts as those shown in FIG. 2. These embodiments are directed to optical signal amplifying circuit 11 destined for amplifying the optical signal undergone analogue modulation.

In general, in conjunction with the amplification of the analogue optical signal, it is noted that the wavelength of an analogue optical signal source tends to chirp (fluctuate) due to the modulation. Thus, there may arise a problem that signal distortion makes appearance when the gain of the optical signal amplifying circuit 11 has remarkable wavelength dependency. Parenthetically, the problem of the wavelength dependency of gain is same as the problem encountered in simultaneous amplification of the wavelength-multiplexed optical signal components explained hereinbefore.

Accordingly, by replacing the optical amplifier 1 in the optical signal amplifying circuit 11 according to the first, fourth and fifth embodiments of the invention described hereinbefore by reference to FIGS. 2, 7 and 8 by an optical amplifier 1 designed for amplifying the optical signal undergone analogue modulation, there can be implemented the optical signal amplifying circuit 11 according to the sixth, seventh and eighth embodiments, respectively, of the invention. In the optical signal amplifying circuits 11 according to these embodiments, flat gain characteristic can be realized over a wide band, whereby the optical signals undergone analogue modulation can be amplified without being accompanied by signal distortions.

As will now be understood from the foregoing description, there can be implemented an optical signal amplifying circuit for wavelength-multiplexed optical signals and analogue signals with wide band so as to accommodate various operation points owing to the use of the optical filer having high reliability and stability with unwanted extra-band excitation light, monitoring light and spontaneous emission light being suppressed satisfactorily.

We claims:

1. An optical signal amplifying circuit using an optical fiber amplifier, comprising:

at least one optical amplifier for amplifying en bloc optical signal components of respective wavelengths contained a wavelength-multiplexed optical signal;

a multi-cavity type dielectric multilayer interference filter disposed at an input side or alternatively at an output side of said optical amplifier or alternatively between said optical amplifiers when a plurality of said optical amplifiers are employed;

an optical level detector for detecting a level of light inputted to the optical signal amplifying circuit; and an optical filter controller, connected to said multi-cavity type dielectric multilayer interference filter and said optical level detector, for controlling said optical multi-cavity type dielectric multilayer interference filter in accordance with the detected input light level so as to have an optimum center wavelength for transmission.

2. An optical signal amplifying circuit using an optical filter amplifier, comprising:

at least one optical amplifier for amplifying an optical signal modulated by an analog signal;

a multi-cavity type dielectric multilayer interference filter disposed at an input side or alternatively at an output side of said optical amplifier or alternatively between said optical amplifiers when a plurality of said optical amplifiers are employed;

an optical level detector for detecting a level of light inputted to the optical signal amplifying circuit; and an optical filter controller, connected to said multi-cavity type dielectric multilayer interference filter and said optical level detector, for controlling said optical multi-cavity type dielectric multilayer interference filter in accordance with the detected input light level so as to have an optimum center wavelength for transmission.

* * * * *